(12) United States Patent
Sugimoto

(10) Patent No.: US 9,469,163 B2
(45) Date of Patent: Oct. 18, 2016

(54) PNEUMATIC TIRE

(75) Inventor: Mutsuki Sugimoto, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 223 days.

(21) Appl. No.: 14/111,491

(22) PCT Filed: Apr. 3, 2012

(86) PCT No.: PCT/JP2012/059075
§ 371 (c)(1),
(2), (4) Date: Oct. 11, 2013

(87) PCT Pub. No.: WO2012/157353
PCT Pub. Date: Nov. 22, 2012

(65) Prior Publication Data
US 2014/0090763 A1  Apr. 3, 2014

(30) Foreign Application Priority Data

May 13, 2011 (JP) ................................. 2011-108478
Mar. 2, 2012 (JP) ................................. 2012-046449

(51) Int. Cl.
*B60C 1/00* (2006.01)
*B60C 5/14* (2006.01)
*B60C 19/00* (2006.01)
*C08L 53/00* (2006.01)

(52) U.S. Cl.
CPC ............. *B60C 19/00* (2013.01); *B60C 1/0008* (2013.04); *B60C 5/14* (2013.01); *C08L 53/005* (2013.01); *B60C 2005/145* (2013.04); *Y10T 152/10495* (2015.01)

(58) Field of Classification Search
CPC ................................. B60C 1/008; B60C 5/14
See application file for complete search history.

(56) References Cited

U.S. PATENT DOCUMENTS

2005/0098252 A1  5/2005  Muraoka et al.
2009/0068476 A1  3/2009  Kirino
(Continued)

FOREIGN PATENT DOCUMENTS

CN   1496865 A    5/2004
CN   101754866 A   6/2010
(Continued)

OTHER PUBLICATIONS

Machine translation of JP 2010-100082, 2010.*

*Primary Examiner* — Justin Fischer
(74) *Attorney, Agent, or Firm* — Birch, Stewart, Kolasch & Birch, LLP

(57) ABSTRACT

Provided is a pneumatic tire including an inner liner disposed inwardly in the tire relative to a carcass ply bridged between a pair of bead portions. The inner liner is formed of a first layer disposed inwardly in the tire and a second layer disposed to be in contact with a rubber layer of the carcass ply. The first layer is a thermoplastic elastomer composition containing a thermoplastic elastomer containing at least one of a styrene-isobutylene-styrene block copolymer and an SIBS modified copolymer having a styrene block moiety modified with acid chloride or acid anhydride having an unsaturated bond. The thermoplastic elastomer composition also contains at least one of an ultraviolet absorber and an antioxidant. The second layer is a thermoplastic elastomer composition containing at least one of a styrene-isoprene-styrene block copolymer and a styrene-isobutylene block copolymer.

4 Claims, 2 Drawing Sheets

(56) References Cited

U.S. PATENT DOCUMENTS

| | | |
|---|---|---|
| 2009/0165914 A1 | 7/2009 | Tomoi |
| 2009/0288749 A1 | 11/2009 | Tomoi |
| 2010/0175804 A1 | 7/2010 | Lesage et al. |
| 2010/0263778 A1 | 10/2010 | Lesage et al. |
| 2011/0056604 A1 | 3/2011 | Sugimoto |
| 2011/0077357 A1 | 3/2011 | Sugimoto |

FOREIGN PATENT DOCUMENTS

| | | | |
|---|---|---|---|
| CN | 102009511 A | | 4/2011 |
| EP | 0 206 756 A2 | | 12/1986 |
| EP | 0 265 053 A2 | | 4/1988 |
| EP | 2 298 577 A1 | | 3/2011 |
| EP | 2 596 933 A1 | | 5/2013 |
| JP | 62-48704 A | | 3/1987 |
| JP | 64-62308 A | | 3/1989 |
| JP | 2005-225899 A | | 8/2005 |
| JP | 2005-344030 | * | 12/2005 |
| JP | 2007-296916 A | | 11/2007 |
| JP | 2009-298986 A | | 12/2009 |
| JP | 2010-100082 | * | 5/2010 |
| JP | 2010-527839 A | | 8/2010 |
| JP | 2010-195969 A | | 9/2010 |
| JP | 4551005 B2 | | 9/2010 |
| JP | 2010-532801 A | | 10/2010 |
| JP | 2011-51320 A | | 3/2011 |
| JP | 2011-74237 A | | 4/2011 |
| JP | 2011-74309 A | | 4/2011 |
| JP | 2012-102269 A | | 5/2012 |
| WO | WO 2006/121140 A1 | | 11/2006 |
| WO | WO 2007/116983 A1 | | 10/2007 |

* cited by examiner

PNEUMATIC TIRE

TECHNICAL FIELD

The present invention relates to a pneumatic tire including an inner liner, and particularly to a pneumatic tire in which flection crack growth resulting from repeated flection deformation during traveling with the tire is prevented in the inner liner, in which durability is increased, and in which weather resistance is improved.

BACKGROUND ART

In recent years, in response to strong social demands for low fuel consumption of vehicles, weight reduction of tires has been sought. Among tire members, weight reduction and the like of an inner liner also have begun. The inner liner is disposed inwardly in a tire, and reduces an amount of leakage of air from inside to outside the pneumatic tire (decrease in air internal pressure) to improve air permeability resistance.

Currently, a rubber composition for such an inner liner employs, for example, a rubber blend mainly containing a butyl rubber. The rubber blend contains the butyl rubber by 70 mass % to 100 mass %, and a natural rubber by 30 mass % to 0 mass %. In this way, the tire is provided with improved air permeability resistance. In addition to butylene, the rubber blend mainly containing the butyl rubber contains isoprene by approximately 1 mass %, which acts with sulfur, vulcanization accelerator, and zinc white to achieve cross-linking between rubber molecules. In the normal case, the above-described butyl-based rubber needs to have a thickness of 0.6 mm to 1.0 mm for a tire of a passenger car, and needs to have a thickness of approximately 1.0 mm to 2.0 mm for a tire of a truck/bus. In order to achieve weight reduction of such tires, use of polymer, which is more excellent in air permeability resistance and can provide an inner liner layer with a thinner thickness than the butyl-based rubber, has been requested.

Conventionally, in order to achieve weight reduction of a tire, it has been proposed to use a film made of a material including thermoplastic resin, instead of the above-described rubber composition. However, the tire is left outdoor during transportation or display at a dealer, and suffers from deterioration due to ultraviolet radiation of sunlight, so that a thermoplastic elastomer deteriorates to cause a crack, resulting in an impression of bad inner appearance. Moreover, since a pneumatic tire is filled with air in its inner space during use, oxygen in the air will permeate the inside of components constituting the tire, causing oxidation to progress with time. An adverse influence will thus be effected on durability of the pneumatic tire. In particular, if a crack occurs in an inner liner, an impression of bad inner appearance is given to a user. Furthermore, gas barrier property partially deteriorates to decrease tire internal pressure.

In addition, during traveling with the tire, large shear strain acts on a vicinity of a shoulder portion in the inner liner. When the material including the thermoplastic resin is used as the inner liner, this shear strain is likely to cause detachment at an adhesion interface between the inner liner and the carcass ply, with the result that air leakage takes place from the tire, disadvantageously.

Meanwhile, in order to achieve weight reduction of the inner liner, a technique also has been proposed to employ a thermoplastic elastomer material. However, it is known that a material, which is made thinner in thickness than the inner liner of butyl rubber and exhibits high air permeability resistance, is inferior to the inner liner of butyl rubber in terms of vulcanization adhesion strength with an insulation rubber or a carcass ply rubber adjacent to the inner liner.

When the inner liner has low vulcanization adhesion strength, air enters between the inner liner and the insulation rubber or the carcass rubber, thus resulting in a so-called air-in phenomenon, in which small balloon-like objects appear. The multiplicity of such small spots in the tire gives a user an impression of bad appearance. In addition, during traveling, the air causes detachment to result in cracks in the inner liner. Accordingly, the tire internal pressure is decreased.

In Patent Document 1 (Japanese Patent Laying-Open No. 2009-298986), titanium oxide is blended with a blend of a butyl-based rubber and nylon resin for preventing ultraviolet degradation. However, besides ultraviolet degradation, durability is disadvantageously decreased by deterioration due to radical occurrence in nylon resin caused by flection fatigue.

In Patent Document 2 (WO 2007/116983), a light sealing layer in which carbon black is blended with a mold lubricant for preventing ultraviolet degradation of a thermoplastic elastomer layer is provided on a surface layer. However, due to fluctuations in the step of applying the mold lubricant, the mold lubricant cannot be applied uniformly in the inner surface of the tire, and a scratch may be caused by the hand of an operator in the step or a user, or another reason. Then, the light sealing layer does not achieve its function, resulting in degraded durability due to ultraviolet degradation.

CITATION LIST

Patent Document

PTD 1: Japanese Patent Laying-Open No. 2009-298986
PTD 2: WO2007/116983

SUMMARY OF INVENTION

Technical Problem

The present invention provides a pneumatic tire including an inner liner, in which flection crack growth resulting from repeated flection deformation during traveling with the tire is prevented in the inner liner, in which durability is increased, and in which weather resistance is improved.

Solution to Problem

The present invention relates to a pneumatic tire including an inner liner disposed inwardly in the tire relative to a carcass ply bridged between a pair of bead portions. The inner liner is formed of a first layer disposed inwardly in the tire and a second layer disposed to be in contact with a rubber layer of the carcass ply. The first layer is a thermoplastic elastomer composition containing a thermoplastic elastomer containing at least one of a styrene-isobutylene-styrene block copolymer and an SIBS modified copolymer having a styrene block moiety modified with acid chloride or acid anhydride having an unsaturated bond, the thermoplastic elastomer composition also containing at least one of an ultraviolet absorber and an antioxidant. The second layer is a thermoplastic elastomer composition containing at least one of a styrene-isoprene-styrene block copolymer and a styrene-isobutylene block copolymer.

In the pneumatic tire of present invention, the first layer preferably contains at least one of the ultraviolet absorber and the antioxidant blended therein by 0.5 mass to 40 mass % of a thermoplastic elastomer component. The thermoplastic elastomer composition of one of the first layer and the second layer preferably contains the SIBS modified copolymer blended therein by 5 mass % to 100 mass % of a thermoplastic elastomer component.

In the pneumatic tire of present invention, thermoplastic elastomer composition of the first layer is preferably a mixture of the styrene-isobutylene-styrene block copolymer and the SIBS modified copolymer. The thermoplastic elastomer composition of one of the first layer and the second layer preferably contains a tackifier blended therein.

Advantageous Effects of Invention

The thermoplastic elastomer composition containing a styrene-isobutylene-styrene block copolymer is likely to suffer from deterioration in a wavelength range of an ultraviolet wavelength of more than or equal to 290 nm. Then, by blending an ultraviolet absorber with the thermoplastic elastomer composition, a function is provided which absorbs light around 320 nm to 350 nm where deterioration is most likely to occur and convert the light into molecular vibrational energy or thermal energy, thereby protecting the thermoplastic elastomer from ultraviolet light. Here, the ultraviolet absorber includes a light stabilizer.

Moreover, in the thermoplastic elastomer, a radical is produced due to flection fatigue during traveling with the tire. The radical induces linked deterioration of a main chain, and invites cracks and destruction of the inner liner made of the thermoplastic elastomer composition. Then, by blending an antioxidant, the radical produced by flection fatigue is captured to serve to prevent deterioration. Here, the antioxidant includes an oxygen absorbent.

DESCRIPTION OF EMBODIMENTS

Figure 1:
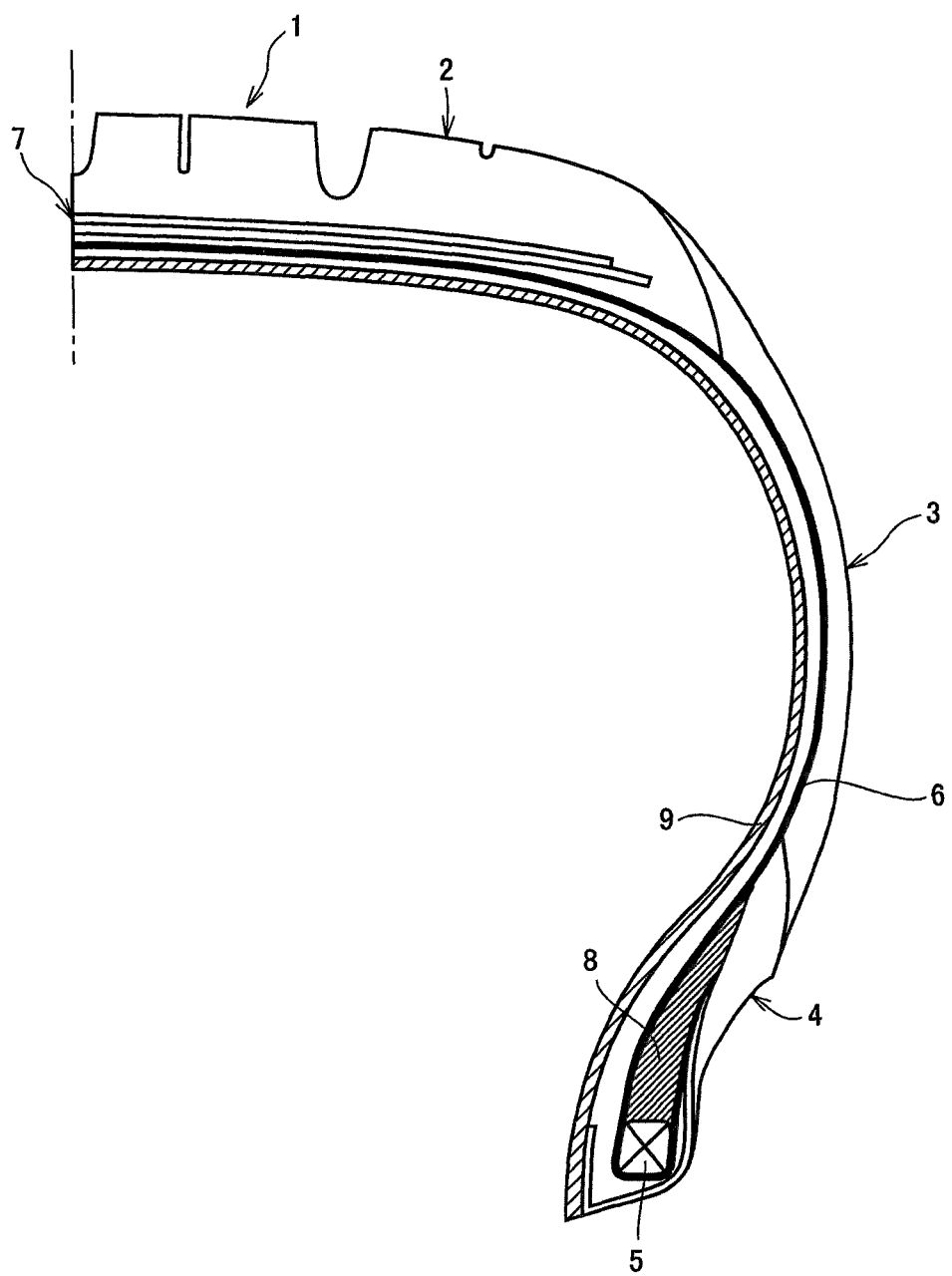
FIG. 1 is a schematic cross sectional view of the right half of a pneumatic tire of the present invention.

<Structure of Tire>
In the present invention, the following describes a pneumatic tire including an inner liner disposed inwardly in the tire, based on the drawings. FIG. 1 is a schematic cross sectional view of the right half of the pneumatic tire. In the figure, pneumatic tire 1 includes a tread portion 2, and a sidewall portion 3 and bead portions 4 so as to form a shape of toroid from the opposite ends of the tread portion. In each of bead portions 4, a bead core 5 is embedded. Further, a carcass ply 6 and a belt layer 7 are disposed. Carcass ply 6 is provided to extend from one bead portion 4 to the other bead portion, and is anchored by winding its ends around bead cores 5. Belt layer 7, which is formed of at least two plies, is disposed outside a crown portion of carcass ply 6.

Belt layer 7 is disposed such that two plies, which are formed of steel cords or cords of aramid fibers or the like, are arranged to allow the cords to cross each other between the plies normally at an angle of 5° to 30° relative to the tire circumferential direction. It should be noted that topping rubber layers can be provided on the outer sides of the ends of the belt layer to reduce detachment in the ends of the belt layer. Further, in the carcass ply, organic fiber cords such as polyester, nylon, or aramid are arranged at substantially 90° relative to the tire circumferential direction. In a region surrounded by the carcass ply and each of its folded-back portions, a bead apex 8 is disposed to extend from the upper end of bead core 5 in the sidewall direction. Further, an inner liner 9 is disposed inwardly relative to carcass ply 6 in the tire radial direction, so as to extend from one bead portion 4 to the other bead portion 4.

<Inner Liner>
In the present invention, the inner liner is formed of a first layer disposed inwardly in the tire and made of a thermoplastic elastomer composition and a second layer made of a thermoplastic elastomer composition disposed in contact with a rubber layer of the carcass ply. Here, the thermoplastic elastomer composition means a composition containing a thermoplastic elastomer or a rubber component as a polymer component. However, a rubber component blended as an additive, for example, polyisobutylene, shall not be included in the thermoplastic elastomer component in the present invention.

<First Layer>
In the present invention, the first layer is formed of a thermoplastic elastomer composition containing at least one of a styrene-isobutylene-styrene block copolymer (hereinafter also called "SIBS") and a styrene-isobutylene-styrene block copolymer modified with acid chloride or acid anhydride whose styrene block moiety has an unsaturated bond (hereinafter also called an "SIBS modified copolymer").

<Styrene-Isobutylene-Styrene Block Copolymer (SIBS)>
Since the SIBS contains an isobutylene block in the molecular chain, a polymer film thereof has excellent air permeability resistance. Therefore, when the SIBS is used for the inner liner, a pneumatic tire excellent in air permeability resistance can be obtained. Furthermore, the molecular structure of the SIBS is saturated except the aromatic unit, so that the SIBS is restrained from suffering from oxidation degradation.

As to the molecular weight of the SIBS, the SIBS preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be decreased. On the other hand, when the weight average molecular weight thereof exceeds 400,000, extrusion workability may become bad. In order to further improve air permeability resistance and durability, the SIBS preferably contains the styrene component at a content of 10 mass % to 30 mass %.

In each block in the molecular chain of the SIBS, the isobutylene unit preferably has a degree of polymerization of approximately 10,000 to 150,000, and the styrene unit preferably has a degree of polymerization of approximately 5,000 to 30,000. The SIBS can be manufactured through a general living cationic polymerization method for a vinyl-based compound. For example, Japanese Patent Laying-Open No. 62-48704 and Japanese Patent Laying-Open No. 64-62308 disclose living cationic polymerization of isobutylene and another vinyl compound.

<SIBS Modified Copolymer>
The first layer is a composition containing an SIBS modified copolymer by 10 mass % to 100 mass % of a thermoplastic elastomer component. The SIBS modified copolymer styrene is obtained by modifying the styrene block moiety of the styrene-isobutylene-styrene block copolymer (SIBS) with acid chloride or acid anhydride having an unsaturated bond, and contains a chemical constitution expressed by Formula (1) below in the molecular chain.

[Formula 1]

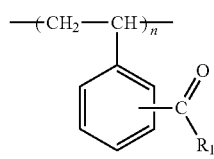

(1)

In Formula (1), n is an integer, and $R_1$ is a monovalent organic group having a functional group.

Examples of acid chloride having an unsaturated bond used for modification in the present invention include methacrylic acid chloride, methacrylic acid bromide, methacrylic acid iodide, acrylic acid chloride, acrylic acid bromide, acrylic acid iodide, crotonic acid chloride, and crotonic acid bromide. In particular, methacrylic acid chloride and acrylic acid chloride are suitable.

Examples of acid anhydride include acetic anhydride, maleic anhydride, phthalic anhydride, and the like. Acetic anhydride is particularly suitable. Two or more of these compounds can also be used in combination. Through such modification, the unsaturated group is introduced into the SIBS, which enables crosslinking through use of a cross linking agent.

As described above, the blending quantity of the SIBS modified copolymer obtained by modifying the styrene-isobutylene-styrene block copolymer with acid chloride and acid anhydride having an unsaturated bond ranges from 10 mass % to 100 mass %, preferably 30 mass % to 100 mass % of a thermoplastic elastomer component. When the blending quantity of the SIBS modified copolymer is less than 10 mass % of the thermoplastic elastomer component, vulcanization adhesion between the second layer and the carcass ply rubber is not sufficient in some cases.

The SIBS modified copolymer contains acid chloride and acid anhydride having an unsaturated bond at a content of more than or equal to 1 weight %, preferably more than or equal to 5 weight %, and less than or equal to 30 weight %.

In order to crosslink the SIBS modified copolymer, a conventional method can be used. For example, thermal crosslinking by heating and crosslinking by a cross linking agent can be performed. As the cross linking agent, organic peroxide, such as, for example, dicumylperoxide, di-tert-butyl peroxide or 2,5-dimethyl-2,5-di-(tert-butylperoxy) hexane can be used.

The blending quantity of organic peroxide preferably ranges from 0.1 part by mass to 3.0 parts by mass relative to 100 parts by mass of the thermoplastic elastomer component.

It is noted that in the thermoplastic elastomer composition of the present invention, polyfunctional vinyl monomer (e.g., divinylbenzene), triaryl cyanurate or a polyfunctional methacrylate monomer (e.g., ethylene glycol dimethacrylate, diethylene glycol dimethacrylate, triethylene glycol dimethacrylate, polyethylene glycol dimethacrylate, trimethylolpropane trimetacrylate, or allyl methacrylate) can be used in combination as a cross linking agent. In this case, the composition after crosslinking can be expected to have improved flection crack characteristics.

Because of the isobutylene block in the SIBS modified copolymer, a film made of the SIBS modified copolymer has excellent air permeability resistance. Moreover, in the SIBS modified copolymer, the unsaturated group is introduced into the ISBS. Thus, crosslinking by thermal crosslinking and a cross linking agent is made possible, and flection crack characteristics and air permeability resistance are improved together with basic characteristics such as tensile strength, break elongation and permanent strain. The characteristics as the inner liner are thus improved.

When manufacturing a pneumatic tire by applying such a polymer film made of a thermoplastic elastomer composition containing the SIBS modified copolymer to the inner liner, air permeability resistance can be secured. Therefore, it is not necessary to use a halogenated rubber, such as a halogenated butyl rubber, which has been conventionally used to provide air permeability resistance and has a high specific gravity. Even if it is used, an amount of usage thereof can be reduced. Accordingly, weight reduction of tire can be achieved, thus obtaining the effect of improving fuel efficiency.

The molecular weight of the SIBS modified copolymer is not particularly limited, but the SIBS modified copolymer preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be unfavorably decreased. On the other hand, when the weight average molecular weight thereof exceeds 400,000, extrusion workability may unfavorably become bad. In order to further improve air permeability resistance and durability, the SIBS preferably contains the styrene component at a content of 10 mass % to 30 mass %, preferably 14 mass % to 23 mass %.

In the copolymer of the SIBS, the isobutylene block preferably has a degree of polymerization in a range of approximately 10,000 to 150,000, and the styrene block preferably has a degree of polymerization in a range of approximately 5,000 to 30,000, in view of rubber elasticity and handling (when the degree of polymerization is less than 10,000, each block will be in a liquid form).

<Manufacture of SIBS Modified Copolymer>

The SIBS can be obtained through a general living cationic polymerization method for a vinyl-based compound. For example, each of Japanese Patent Laying-Open No. 62-48704 and Japanese Patent Laying-Open No. 64-62308 discloses that living cationic polymerization is possible between isobutylene and another vinyl compound and use of isobutylene and another compound for a vinyl compound allows for production of a polyisobutylene-based block copolymer.

For manufacturing the SIBS modified copolymer, the following method can be adopted, for example. The styrene-isobutylene-styrene block copolymer is input into a separable flask, and then the inside of a polymerization vessel is substituted by nitrogen gas. Then, an organic solvent (e.g., n-hexane and butyl chloride) having been dried with molecular sieves is added, and methacrylic acid chloride is further added. At last, aluminum trichloride is added while stirring the solution to produce a reaction. A predetermined amount of water is added to the reaction solution after a certain period of time since the start of reaction, and the solution is stirred. The reaction is then terminated. The reaction solution is washed several times or more with a large amount of water, and further, slowly dropped into a large amount of a methanol-acetone mixed solvent to precipitate a polymer. The resulting polymer is vacuum dried. It is noted that the method of manufacturing the SIBS modified copolymer is disclosed in Japanese Patent No. 4551005, for example.

<Thermoplastic Elastomer Composition Containing SIBS Modified Copolymer>

The first layer is a thermoplastic elastomer composition mainly containing the SIBS modified copolymer. In other words, the first layer contains the SIBS modified copolymer by more than or equal to 90 mass % in the thermoplastic elastomer component. As the thermoplastic elastomer, a styrene-based thermoplastic elastomer, an urethane-based thermoplastic elastomer, or the like can be suitably used.

A rubber component can be blended into the thermoplastic elastomer composition of the first layer. By blending the rubber component, tackiness with an adjacent carcass ply in an unvulcanized state can be provided, and vulcanization adhesive property with the carcass ply or the insulation can be increased through vulcanization.

As the rubber component, at least one selected from the group consisting of natural rubber, isoprene rubber, chloroprene rubber, and butyl rubber is preferably contained. The blending quantity of the rubber component preferably ranges from 5 mass % to 75 mass % in the polymer component.

<Ultraviolet Absorber>

In the present invention, an ultraviolet absorber is blended into the elastomer composition. The ultraviolet absorber absorbs light in an ultraviolet range of wavelength of more than or equal to 290 nm to prevent deterioration of the molecular chain of the polymer compound. For example, benzophenone-based, salicylate-based, and benzotriazol-based ultraviolet absorbers absorb ultraviolet light of wavelength around 320 nm to 350 nm where the polymer compound is most likely to suffer from deterioration. The absorbers have the function of converting light in this wavelength range into vibrational energy or thermal energy, thereby preventing absorption into the polymer compound. In particular, the benzotriazol-based ultraviolet absorber can absorb a wide range of ultraviolet light. Here, examples of the ultraviolet absorber are listed below.

[Benzotriazol-Based Ultraviolet Absorber]

TINUVIN P/FL (provided by BASF, and having a molecular weight of 225, a melting point of 128° C. to 132° C., and a maximum absorption wavelength of 341 nm) (2-(2-hydroxy-benzotriazol-2-yl)-p-cresol)

TINUVIN 234 (provided by BASF, and having a molecular weight of 447.6, a melting point of 137° C. to 141° C., and a maximum absorption wavelength of 343 nm) (2-[2-hydroxy-3,5-bis($\alpha,\alpha'$ dimethylbenzyl) phenyl]-2H-benzotriazol)

TINUVIN 326/FL (provided by BASF, and having a molecular weight of 315.8, a melting point of 138° C. to 141° C., and a maximum absorption wavelength of 353 nm), ADK STAB LA-36 (provided by ADEKA Corporation) (2-(2'-hydroxy-3'-tert-butyl-5'-methylphenyl)-5-chlorobenzotriazol)

TINUVIN 237 (provided by BASF, and having a molecular weight of 338.4, a melting point of 139° C. to 144° C., and a maximum absorption wavelength of 359 nm) (2,4-di-t-butyl-6-(5-chlorobenzotriazol-2-yl-)phenol)

TINUVIN 328 (provided by BASF, and having a molecular weight of 351.5, a melting point of 80° C. to 88° C., and a maximum absorption wavelength of 347 nm) (2-(3,5-di-t-amyl-2-hydroxyphenyl)benzotriazol)

TINUVIN 329/FL (provided by BASF, and having a molecular weight of 323, a melting point of 103° C. to 105° C., and a maximum absorption wavelength of 343 nm) (2-(2-hydroxy-benzotriazol-2-yl)-4-tert-octylphenol).

[Liquid Ultraviolet Absorber]

TINUVIN 213 (provided by BASF, and having a melting point of −40° C. and a maximum absorption wavelength of 344 nm) (5-(2-hydroxy-benzotriazol-2-yl)-4-hydroxy-3-tert-butylbenzenpropanoic acid methyl)

TINUVIN 571 (provided by BASF, and having a molecular weight of 393.6, a melting point of −56° C. and a maximum absorption wavelength of 343 nm) (2-(2-hydroxybenzotriazol-2-yl)-4-methyl-6-dodecylphenol).

[Triazine-Based Ultraviolet Absorber]

TINUVIN 1577FF (provided by BASF, and having a molecular weight of 425, a melting point of 148° C. and a maximum absorption wavelength of 274 nm) (2-[4,6-diphenyl-1,3,5-triazine-2-yl]-5-(hexyloxy)phenol).

[Benzophenone-Based Ultraviolet Absorber]

CHIMASSORB 81/FL (provided by BASF, and having a molecular weight of 326.4 and a melting point of 48° C. to 49° C.) (2-hydroxy-4-(octyloxy)benzophenone).

[Benzoate-Based Ultraviolet Absorber]

TINUVIN 120 (provided by BASF, and having a molecular weight of 438.7, a melting point of 192° C. to 197° C., and a maximum absorption wavelength of 265 nm) (2,4-di-tert-butylphenyl-3,5-di-tert-butyl-4-hydroxybenzoate).

[Hindered Amine Stabilizer]

CHIMASSORB 2020 FDL (provided by BASF, and having a molecular weight of 2600 to 3400 and a melting point of 130° C. to 136° C.) (polycondensate of dibutylamine 1,3,5-triazine N,N-bis(2,2,6,6-tetramethyl-4-piperidyl-1,6-hexamethylenediamine N-(2,2,6,6-tetramethyl-4-piperidyl) butylamine)

CHIMASSORB 944 FDL (provided by BASF, and having a molecular weight of 2000 to 3100 and a melting point of 100° C. to 135° C.) (poly[{6-(1,1,3,3-tetramethylbutyl) amino-1,3,5-triazine-2,4-diyl} {(2,2,6,6-tetramethyl-4-piperidyl)imino} hexamethylene {2,2,6,6-tetramethyl-4-piperidyl)imino}])

TINUVIN 622 LD (provided by BASF, and having a molecular weight of 3100 to 4000 and a melting point of 55° C. to 70° C.) (butanedioic acid 1-[2-(4-hydroxy-2,2,6,6-tetramethyl-piperidino)ethyl])

TINUVIN 144 (provided by BASF, and having a molecular weight of 685 and a melting point of 146° C. to 150° C.) (2-butyl-2-[3,5-di(tert-butyl)-4-hydroxybenzyl]malonic acid bis(1,2,2,6,6-pentamethyl-4-piperidyl)

TINUVIN 292 (provided by BASF, and having a molecular weight of 509) (sebacic acid bis(1,2,2,6,6-pentamethyl-4-piperidinyl)

TINUVIN 770 DF (provided by BASF, and having a molecular weight of 481 and a melting point of 81° C. to 85° C.) (sebacic acid bis(2,2,6,6-tetramethylpiperidine-4-yl).

In the present invention, ultraviolet transmission is restrained by blending titanium oxide into the thermoplastic elastomer composition. Deterioration due to ultraviolet radiation can therefore be prevented. When blending titanium oxide into the thermoplastic elastomer, care should be taken to achieve uniform dispersion in mixing because poor dispersion may result in degraded durability.

<Antioxidant>

In the present invention, an antioxidant is blended into the elastomer composition. The antioxidant can function as a radical supplementary agent to mainly supplement a carbon radical, thereby preventing deterioration of the molecular chain of the polymer. Examples of the antioxidant are listed below.

[Hindered Phenolic Antioxidant]

IRGANOX1010 (provided by BASF), ADK STAB AO-60 (provided by ADEKA Corporation), SUMILIZER BP-101 (provided by Sumitomo Chemical Co, Ltd.) (pentaerythrityl tetrakis[3-(3,5-di-t-butyl-4-hydroxyphenyl)propionate])

IRGANOX1035 (provided by BASF) (2,2-thio-diethylenebis[(3-(3,5-di-t-butyl-4-hydroxyphenyl) propionate)])

IRGANOX1076 (provided by BASF) (octadecyl-3-(3,5-di-t-butyl-4-hydroxyphenyl) propionate)

IRGANOX1098 (provided by BASF) (N,N'-hexamethylenebis(3,5-di-t-butyl-4-hydroxy-hydrocinnamamide)

IRGANOX1135 (provided by BASF) (isooctyl-3-(3,5-di-t-butyl-4-hydroxyphenyl) propionate])

IRGANOX1330 (provided by BASF) (1,3,5-trimethyl-2,4,6-tris(3,5-di-t-butyl-4-hydroxybenzyl)benzene)

IRGANOX1726 (provided by BASF) (4,6-bis(dodecylthiomethyl)-O-cresol)

IRGANOX1425 (provided by BASF) (bis(3,5-di-t-butyl-4-hydroxybenzylphosphonic acid ethyl) calcium (50%), polyethylene wax (50%))

IRGANOX1520 (provided by BASF) (2,4-bis[(octylthio)methyl]-O-cresol)

IRGANOX245 (provided by BASF) (triethyleneglycol-bis[(3-(3-t-butyl-5-methyl-4-hydroxyphenyl) propionate)])

IRGANOX259 (provided by BASF) (1,6-hexanediol-bis[(3-(3,5-di-t-butyl-4-hydroxyphenyl) propionate])

IRGANOX3114 (provided by BASF) (tris-(3,5-di-t-butyl-4-hydroxybenzyl)-isocyanurate)

IRGANOX5057 (provided by BASF) (octylated diphenylamine)

IRGANOX565 (provided by BASF) (2,4-bis-(n-octylthio)-6-(4-hydroxy-3,5-di-t-butylanilino)-1,3,5-triazine)

Cyanox CY1790 (provided by Sun Chemical Company Ltd.) (1,3,5-tris(4-t-butyl-3-hydroxy-2,6-dimethylbenzyl) isocyanuric acid)

ADK STAB AO-40 (provided by ADEKA Corporation), SUMILIZER BBM (provided by Sumitomo Chemical Co., Ltd.) (4,4'-butylidenebis(3-methyl-6-t-butylphenol)

ADK STAB AO-50 (provided by ADEKA Corporation), SUMILIZER BP-76 (provided by Sumitomo Chemical Co., Ltd.) (stearyl-β-(3,5-di-t-butyl-4-hydroxyphenyl) propionate)

ADK STAB AO-80 (provided by ADEKA Corporation), SUMILIZER GA-80 (provided by Sumitomo Chemical Co., Ltd.) (3,9-bis[1,1-dimethyl-2-[β-(3-t-butyl-4-hydroxy-5-methylphenyl)propionyloxy]ethyl]2,4,8,10-tetraoxaspiro[5,5]-undecane).

[Phosphorus-Based Antioxidant]

A phosphorus-based antioxidant is used as a peroxide decomposition agent, and has an excellent antioxidant function in thermal process shaping. Examples thereof are listed below.

IRGAFOS12 (provided by BASF, and having a molecular weight of 1462.9) (6,6',6"-[nitrilotris(ethyleneoxy)]tris(2,4,8,10-tetra-tert-butylbenzo[d,f][1,3,2]dioxaphosphepin))

IRGAFOS38 (provided by BASF, and having a molecular weight of 514) (phosphorous acid ethylbis(2,4-di-tert-butyl-6-methylphenyl))

IRGAFOS168 (provided by BASF, and having a molecular weight of 646), ADK STAB 2112 (provided by ADEKA Corporation), SUMILIZER P-16 (provided by Sumitomo Chemical Co., Ltd.) (tris(2,4-di-t-butylphenyl)phosphite)

ADK STAB PEP-8 (provided by ADEKA Corporation) (distearyl pentaerythritol diphosphite)

ADK STAB PEP-36 (provided by ADEKA Corporation) (cyclic neopentanetetraylbis(2,6-di-t-butyl-4-methylphenyl) phosphite).

[Hydroxylamine-Based]

IRGASTAB FS 042 (provided by BASF) (N,N-dioctadecylhydroxylamine).

[Hindered Phenol/Phosphorus Mixture-Based Antioxidant]

IRGANOX B 225 (provided by BASF) (IRGAFOS168: IRGANOX1010=1:1)

IRGANOX215 (provided by BASF) (IRGAFOS168: IRGANOX1010=2:1)

IRGANOX220 (provided by BASF) (IRGAFOS168: IRGANOX1010=3:1)

and IRGANOX921 (provided by BASF) (IRGAFOS168: IRGANOX1076=2:1).

[Oxygen Absorbent]

In the present invention, the antioxidant is a concept covering an oxygen absorbent. As the oxygen absorbent, a typical oxygen absorbent having a capacity to capture oxygen in the air can be used. Examples thereof can include an iron powder oxygen absorbent that absorbs oxygen in the air by way of oxidizing reaction of iron powder. Common use is a combination of 0.1 part by weight to 50 parts by weight of halogenated metal, for example, alkali metal such as sodium chloride, sodium bromide, calcium chloride, and magnesium chloride, or a halide such as chloride, bromide and iodide of alkaline earth metal with 100 parts by weight of iron powder having a surface area of more than or equal to 0.5 m$^2$/g. This may be a mixture thereof or may be obtained by coating the surface of iron powder with halogenated metal. It is noted that porous particles, such as zeolite, impregnated with water content can be further combined into the oxygen absorbent used in the present invention to further promote the aforementioned oxidation of iron by oxygen. In particular, a hindered phenolic antioxidant is preferable as a radical trap agent for a carbon radical.

In the present invention, at least one or two or more of the above-mentioned ultraviolet absorbers and antioxidants can be used in combination. In particular, it is preferable to use a benzotriazole-based ultraviolet absorber and a hindered phenolic antioxidant in combination. As for the first layer, it is preferable that at least one of the above-mentioned ultraviolet absorber and antioxidant be blended by 0.5 mass % to 40 mass % of the thermoplastic elastomer component. If this blending ratio is less than 0.5 mass %, the effect that can be expected by addition of the above-mentioned ultraviolet absorber or the above-mentioned antioxidant may not be fully demonstrated. On the other hand, if this blending ratio exceeds 40 mass %, the original function of the first layer may be degraded. At least one of the above-mentioned ultraviolet absorber and antioxidant is preferably blended by 2.0 mass % to 20 mass % of the thermoplastic elastomer component.

<Thickness of First Layer>

The first layer has a thickness of 0.05 mm to 0.6 mm. If the thickness of the first layer is less than 0.05 mm, the first layer may be broken due to pressing pressure when vulcanizing the raw tire in which the polymer layer stack formed of the first and second layers is applied to the inner liner, with the result that an air leakage phenomenon may take place in the resulting tire. On the other hand, if the thickness of the first layer exceeds 0.6 mm, the weight of the tire is increased to result in decreased performance in fuel efficiency. Further, the first layer preferably has a thickness of 0.05 mm to 0.4 mm. The first layer can be formed by adopting a general method for forming a thermoplastic resin or a thermoplastic elastomer into a film, such as extrusion molding or calender molding.

<Second Layer>

The second layer is a thermoplastic elastomer composition containing at least one of a styrene-isoprene-styrene block copolymer (hereinafter, also referred to as "SIS") and a styrene-isobutylene block copolymer (hereinafter, also referred to as "SIB").

The second layer can contain an SIBS modified copolymer, a styrene-based thermoplastic elastomer or a rubber component. The SIBS modified copolymer ranges from 5 mass % to 80 mass %, preferably 10 mass % to 80 mass % of the whole thermoplastic elastomer component. If the SIBS modified copolymer is less than 5 mass %, vulcanization adhesion strength with the first layer may be decreased, and If the SIBS modified copolymer exceeds 80 mass %, adhesion strength with the carcass ply may be decreased.

Here, the styrene-based thermoplastic elastomer refers to a copolymer including a styrene block as a hard segment. Examples thereof include: a styrene-isoprene-styrene block copolymer (hereinafter, also referred to as "SIS"); a styrene-isobutylene block copolymer (hereinafter, also referred to as "SIB"); a styrene-butadiene-styrene block copolymer (hereinafter, also referred to as "SBS"); a styrene-isobutylene-styrene block copolymer (hereinafter, also referred to as "SIBS"); a styrene-ethylene butene-styrene block copolymer (hereinafter, also referred to as "SEBS"); a styrene-ethylene propylene-styrene block copolymer (hereinafter, also referred to as "SEPS"); a styrene-ethylene ethylene propylene-styrene block copolymer (hereinafter, also referred to as "SEEPS"); and a styrene-butadiene butylene-styrene block copolymer (hereinafter, also referred to as "SBBS").

Further, the styrene-based thermoplastic elastomer may have a molecular structure having an epoxy group. A usable example thereof is Epofriend A1020 provided by Daicel Chemical Industries Ltd., i.e., an epoxy modified styrene-butadiene-styrene copolymer (epoxidized SBS) (having a weight average molecular weight of 100,000 and an epoxy equivalent of 500).

The isoprene block of the styrene-isoprene-styrene copolymer (SIS) is a soft segment. Hence, a polymer film made of the SIS is likely to adhere to a rubber component through vulcanization. Therefore, when the polymer film made of the SIS is used for the inner liner, a pneumatic tire excellent in durability can be obtained because that inner liner is excellent in adhesive property with the rubber layer of the carcass ply, for example.

The molecular weight of the SIS is not particularly limited, but the SIS preferably has a weight average molecular weight of 100,000 to 290,000 measured through GPC measurement, in view of rubber elasticity and moldability. When the weight average molecular weight thereof is less than 100,000, tensile strength may be unfavorably decreased. On the other hand, when the weight average molecular weight thereof exceeds 290,000, extrusion workability unfavorably becomes bad. The SIS preferably contains the styrene component at a content of 10 mass % to 30 mass % in view of tackiness, adhesive property, and rubber elasticity.

In the present invention, it is preferable that in the SIS, the isoprene block has a degree of polymerization in a range of approximately 500 to 5,000 and the styrene block has a degree of polymerization in a range of approximately 50 to 1,500 in view of rubber elasticity and handling.

The SIS can be obtained through a general polymerization method for a vinyl-based compound, such as the living cationic polymerization method. The SIS layer can be obtained by forming the SIS in the form of a film by means of a general method for forming a thermoplastic resin or a thermoplastic elastomer into a film, such as extrusion molding or calender molding.

The isobutylene block of the styrene-isobutylene block copolymer (SIB) is a soft segment. Hence, a polymer film made of the SIB is likely to adhere to a rubber component through vulcanization. Therefore, when the polymer film made of the SIB is used for the inner liner, a pneumatic tire excellent in durability can be obtained because that inner liner is excellent in adhesive property with an adjacent rubber forming the carcass or insulation, for example.

For the SIB, a linear SIB is preferably used in view of rubber elasticity and adhesive property. The molecular weight of the SIB is not particularly limited, but the SIS preferably has a weight average molecular weight of 40,000 to 120,000 measured through GPC measurement, in view of rubber elasticity and moldability. When the weight average molecular weight thereof is less than 40,000, tensile strength may be unfavorably decreased. On the other hand, when the weight average molecular weight thereof exceeds 120,000, extrusion workability may unfavorably become bad. The SIB preferably contains the styrene component at a content of 10 mass % to 35 mass %, in view of tackiness, adhesive property, and rubber elasticity. In the present invention, it is preferable that in the SIB, the isobutylene block has a degree of polymerization in a range of approximately 300 to 3,000 and the styrene block has a degree of polymerization in a range of approximately 10 to 1,500 in view of rubber elasticity and handling.

The SIB can be obtained through general living polymerization for a vinyl-based compound. For example, the SIB can be obtained by adding methylcyclohexane, n-butyl chloride, and cumyl chloride into an agitator, cooling them to −70° C., reacting them for 2 hours, then adding a large amount of methanol to stop the reaction, and performing vacuum-drying at 60° C.

The SIB layer can be obtained by molding the SIB through a general method for forming a styrene-based thermoplastic elastomer into a film, such as extrusion molding or calender molding. The second layer preferably has a thickness of 0.01 mm to 0.3 mm. Here, when the second layer is formed of only one layer such as an SIS layer or SIB, for example, the thickness of the second layer refers to the thickness thereof. On the other hand, when the second layer is formed of a plurality of layers including an SIS layer, an SIB layer and the like, for example, the thickness of the second layer refers to the total thickness of these layers. If the thickness of the second layer is less than 0.01 mm, the second layer may be broken due to pressing pressure when vulcanizing the raw tire in which the polymer layer stack is applied to the inner liner, with the result that vulcanization adhesion strength may be decreased. On the other hand, if the thickness of the second layer exceeds 0.3 mm, the weight of the tire is increased to possibly result in decreased performance in fuel efficiency. Further, the second layer preferably has a thickness of 0.05 mm to 0.2 mm.

It should be noted that the second layer is preferably formed of a combined layer of the SIS layer and the SIB layer, but a film made of urethane rubber or silicone rubber can be disposed as a third layer between the first layer and the SIS layer, between the first layer and the SIB layer, or between the SIS layer and the SIB layer.

<Mixture with SIB S>

In the present invention, the second layer can be formed of a mixture of the SIS and the SIBS or a mixture of the SIB and the SIBS. In this case, an amount of blending the SIBS is adjusted to fall within a range of 10 mass % to 80 mass %, preferably 30 mass % to 70 mass % in the thermoplastic elastomer component. When the SIBS is smaller than 10 mass %, adhesive property with the first layer tends to be decreased. When the SIBS exceeds 80 mass %, adhesive property with the carcass ply tends to be decreased.

<Tackifier>

In the present invention, in at least one of the first layer and the second layer, the tackifier is blended by 0.1 part by mass to 100 parts by mass relative to 100 mass of the thermoplastic elastomer content. Here, the tackifier refers to a compounding agent for increasing tackiness of the thermoplastic elastomer composition. Examples of such a tackifier will be listed below.

Typically, there are C9 petroleum resin and C5 petroleum resin. Here, a C9 petroleum resin is an aromatic petroleum resin obtained by polymerizing C5 to C9 fractions (mainly C9 fraction) in a mixed state. The C5 to C9 fractions are remnants when obtaining useful compounds, such as ethylene, propylene, and butadiene, by thermally decomposing naphtha. Examples thereof include products such as: ARKON P70, P90, P100, P125, P140, M90, M100, M115, and M135 (each provided by Arakawa Chemical Industries, Ltd., and having a softening point of 70° C. to 145° C.); I-MARV S100, S110, P100, P125, and P140 (aromatic copolymer-based hydrogenated petroleum resins each provided by Idemitsu Petrochemical Ltd., having a softening point of 100° C. to 140° C., a weight average molecular weight of 700 to 900, and a bromine number of 2.0 g/100 g to 6.0 g/100 g); and Petcoal XL (provided by TOSOH Corporation).

A C5 petroleum resin is an aliphatic petroleum resin obtained by polymerizing C4 to C5 fractions (mainly C5 fraction) in a mixed state. The C4 to C5 fractions are remnants when obtaining useful compounds, such as ethylene, propylene, and butadiene, by thermally decomposing naphtha. Examples thereof include products such as: Hilets G100 (provided by Mitsui Petrochemicals Industries, Ltd., and having a softening point of 100° C.); Marcalets T100AS (provided by Maruzen Petrochemical Co., Ltd., and having a softening point of 100° C.); and Escorez 1102 (provided by Tonex Co., Ltd., and having a softening point of 110° C.).

Examples of the terpene resin include products such as: YS resin PX800N, PX1000, PX1150, PX1250, and PXN1150N; and Clearon P85, P105, P115, P125, P135, P150, M105, M115, and K100 (each provided by Yasuhara Chemical Co., Ltd., and having a softening point of 75° C. to 160° C.).

Examples of the aromatic modified terpene resin include products such as: YS resin TO85, TO105, T0115, and TO125 (each provided by Yasuhara Chemical Co., Ltd., and having a softening point of 75° C. to 165° C.).

Examples of the terpene phenol resin include products such as: Tamanol 803L, 901 (provided by Arakawa Chemical Industries Co., Ltd., and having a softening point of 120° C. to 160° C.); and YS Polyster U115, U130, T80, T100, T115, T145, and T160 (each provided by Yasuhara Chemical Co., Ltd., and having a softening point of 75° C. to 165° C.).

Examples of the cumarone resin include a cumarone resin having a softening point of 90° C. (provided by Kobe Oil Chemical Industrial Co., Ltd.).

Examples of the cumarone indene oil include products such as 15E (provided by Kobe Oil Chemical Industrial Co., Ltd., and having a pour point of 15° C.).

Examples of the rosin ester include products such as: ester gum AAL, A, AAV, 105, AT, H, HP, and HD (each provided by Arakawa Chemical Industries Co., Ltd., and having a softening point of 68° C. to 110° C.); and Hariester TF, S, C, DS70L, DS90, and DS130 (each provided by Harima Chemicals Inc., and having a softening point of 68° C. to 138° C.).

Examples of the hydrogenated rosin ester include products such as Superester A75, A100, A115, and A125 (each provided by Arakawa Chemical Industries Co., Ltd., and having a softening point of 70° C. to 130° C.).

Examples of the alkylphenol resin include products such as Tamanol 510 (provided by Arakawa Chemical Industries Co., Ltd., and having a softening point of 75° C. to 95° C.).

Examples of the DCPD include products such as Escorez 5300 (provided by Tonex Co., Ltd., and having a softening point of 105° C.).

For the tackifier, a fully hydrogenated petroleum resin of the C9 petroleum resins is well compatible with the SIB, and can improve adhesive property without decreasing the gas barrier property. Further, it has an effect of decreasing a degree of viscosity, and therefore can be used advantageously for film extrusion molding.

The tackifier is blended in a range of 0.1 part by mass to 100 parts by mass, preferably, 1 part by mass to 50 parts by mass relative to 100 parts by mass of the thermoplastic elastomer content of the first layer. If the tackifier is blended by less than 0.1 part by mass, vulcanization adhesion strength with the second layer is insufficient. On the other hand, if the tackifier is blended by more than 100 parts by mass, the tackiness becomes too high, with the result that workability and productivity are decreased and the gas barrier property is also decreased.

The second layer is disposed between the first layer inside the tire and the carcass ply, and is required to have adhesive property with them. Therefore, the tackifier is blended in a range of 0.1 part by mass to 100 parts by mass, preferably, 1 part by mass to 50 parts by mass relative to 100 parts by mass of the thermoplastic elastomer content of the second layer. If the tackifier is blended by less than 0.1 part by mass, vulcanization adhesion strength with the first layer is insufficient. On the other hand, if the tackifier is blended by more than 100 parts by mass, the tackiness becomes too high, with the result that workability and productivity are decreased and the gas barrier property is also decreased.

The second layer is adjusted to have a thickness ranging from 0.05 mm to 0.3 mm. It is noted that, when the second layer is formed of a plurality of layers, the total thickness is preferably adjusted to range from 0.05 mm to 0.3 mm.

<Polymer Layer Stack>

In the present invention, the inner liner employs the polymer layer stack formed of the first layer and the second layer. Here, the first layer and the second layer are thermoplastic elastomer compositions, and are in a softened state in a mold at a vulcanizing temperature of, for example, 150° C. to 180° C. The softened state refers to an intermediate state between solid and liquid with improved molecular mobility. When in the softened state, the thermoplastic elastomer composition has improved reactivity as compared with the solid state, and therefore sticks or adheres to the adjacent component. Therefore, it is preferable to provide a cooling step when manufacturing a tire in order to prevent change in shape of the thermoplastic elastomer composition, adhesion to the adjacent component and welding to the adjacent component. After the tire vulcanization, the cooling step is performed by quenching for 10 seconds to 300 seconds to 50° C. to 120° C. to cool the inside of the bladder. For a coolant, one or more of coolants selected from air, water vapor, water, and oil are used. By employing such a cooling step, the inner liner is easily formed to be thin, i.e., to fall within a range of 0.05 mm to 0.6 mm.

Figure 2:
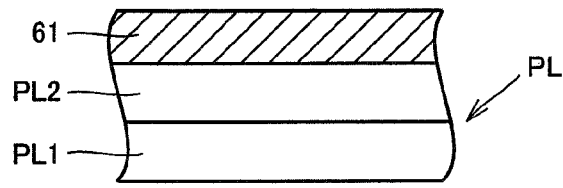
FIG. 2 is a schematic cross sectional view showing a bonding state of an inner liner and a carcass.

The following illustrates an arrangement of the inner liner with respect to the carcass ply in the vulcanized tire, with reference to FIG. 2. In FIG. 2, a polymer layer stack PL is formed of an SIBS layer or SIBS modified copolymer layer PL1 serving as the first layer, and an SIS layer PL2 serving as the second layer. When applying polymer layer stack PL to the inner liner of the pneumatic tire and disposing SIS layer PL2 outwardly in the tire radial direction so as to be in contact with carcass ply 6, adhesive strength between SIS layer PL2 and carcass 61 can be increased in the step of vulcanizing the tire. Accordingly, in the resulting pneumatic tire, the inner liner and the rubber layer of carcass ply 6 are adhered to each other in an excellent manner. Thus, the pneumatic tire can have excellent air permeability resistance and durability.

Figure 3:
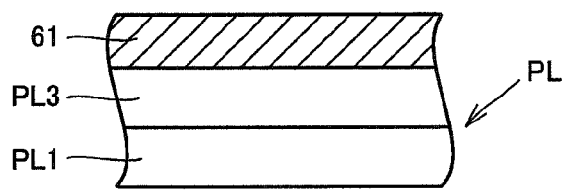
FIG. 3 is a schematic cross sectional view showing a bonding state of an inner liner and the carcass.

In FIG. 3, polymer layer stack PL is formed of SIBS layer or SIBS modified copolymer layer PL1 serving as the first layer, and an SIB layer PL3 serving as the second layer. When applying polymer layer stack PL to the inner liner of the pneumatic tire and disposing a surface of SIB layer PL3 outwardly in the tire radial direction so as to be in contact with carcass ply 6, adhesive strength between SIB layer PL3 and carcass 61 can be increased in the step of vulcanizing the tire. Accordingly, in the resulting pneumatic tire, the inner liner and the rubber layer of carcass ply 6 are adhered to each other in an excellent manner. Thus, the pneumatic tire can have excellent air permeability resistance and durability.

Figure 4:
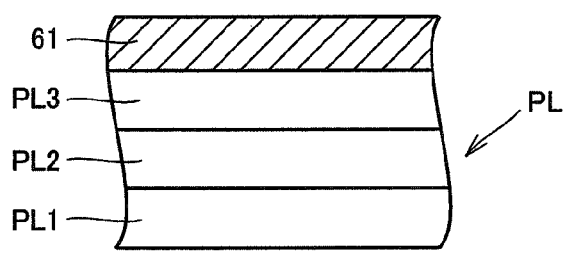
FIG. 4 is a schematic cross sectional view showing a bonding state of an inner liner and the carcass.

In FIG. 4, polymer layer stack PL is formed of SIBS layer or SIBS modified copolymer layer PL1 serving as the first layer, SIS layer PL2 and SIB layer PL3 both serving as the second layer. SIBS layer PL1, SIS layer PL2, and SIB layer PL3 are stacked on one another in this order. When applying polymer layer stack PL to the inner liner of the pneumatic tire and disposing a surface of SIB layer PL3 outwardly in the tire radial direction so as to be in contact with carcass ply 6, adhesive strength between SIB layer PL3 and carcass ply 6 can be increased in the step of vulcanizing the tire. Accordingly, in the resulting pneumatic tire, the inner liner and the rubber layer of carcass ply 6 are adhered to each other in an excellent manner. Thus, the pneumatic tire can have excellent air permeability resistance and durability.

Figure 5:
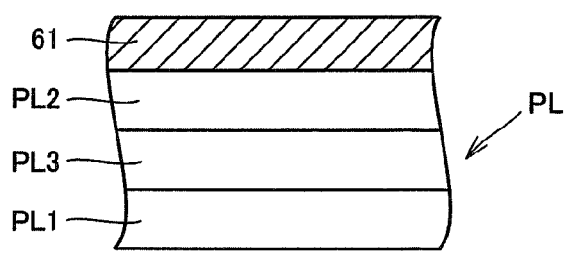
FIG. 5 is a schematic cross sectional view showing a bonding state of an inner liner and the carcass.

In FIG. 5, polymer layer stack PL is formed of SIBS layer or SIBS modified copolymer layer PL1 serving as the first layer, and SIB layer PL3 and SIS layer PL2 both serving as the second layer. SIBS layer PL1, SIB layer PL3, and SIS layer PL2 are stacked on one another in this order. When applying polymer layer stack PL to the inner liner of the pneumatic tire and disposing a surface of SIS layer PL2 outwardly in the tire radial direction so as to be in contact with carcass ply 6, adhesive strength between SIS layer PL2 and carcass ply 6 can be increased in the step of vulcanizing the tire. Accordingly, the inner liner and the rubber layer of carcass ply 6 are adhered to each other in an excellent manner. Thus, the pneumatic tire can have excellent air permeability resistance and durability.

<Method for Manufacturing Pneumatic Tire>

The pneumatic tire of the present invention can be manufactured using a general manufacturing method. First, polymer layer stack PL described above is used to manufacture the inner liner. Pneumatic tire 1 can be manufactured by applying the above-described inner liner to the raw tire of pneumatic tire 1 and vulcanizing and molding them together with other members. When disposing polymer layer stack PL on the raw tire, the second layer of polymer layer stack PL, i.e., SIS layer PL2 or SIB layer PL3 is disposed outwardly in the tire radial direction so as to be in contact with carcass ply 6. With this arrangement, adhesive strength between SIS layer PL2 or SIB layer PL3 and carcass ply 61 can be increased in the step of vulcanizing the tire. In the resulting pneumatic tire, the inner liner and the rubber layer of carcass ply 6 are adhered to each other in an excellent manner. Thus, the pneumatic tire can have excellent air permeability resistance and durability.

EXAMPLES

<Polymer Layer Stack>

The thermoplastic elastomers (SIB, SIBS, SIS, and SIBS modified copolymer), ultraviolet absorber and antioxidant used for manufacturing the polymer layer stack formed of the first layer and the second layer in the present invention were prepared in the following manner.

[SIB]

Into a 2 L reaction container having an agitator, 589 mL of methylcyclohexane (dried with molecular sieves), 613 ml of n-butyl chloride (dried with molecular sieves), and 0.550 g of cumyl chloride were added. The reaction container was cooled to −70° C., and then 0.35 mL of α-picoline (2-methylpyridine) and 179 mL of isobutylene were added. Further, 9.4 mL of titanium tetrachloride was added to start polymerization. They were reacted with each other for 2.0 hours while stirring the solution at −70° C. Next, 59 mL of styrene was added to the reaction container, and reaction was continued for another 60 minutes. Thereafter, a large amount of methanol was added to stop the reaction. After removing a solvent and the like from the reaction solution, the polymer was dissolved with toluene and rinsed twice. This toluene solution was added to a methanol mixture to precipitate a polymer. The polymer thus obtained was dried at 60° C. for 24 hours, thereby obtaining a styrene-isobutylene diblock copolymer (the content of the styrene component: 15 mass %; weight average molecular weight: 70,000).

[SIBS]

"SIBSTAR 102T (Shore A hardness: 25; the content of the styrene component: 25 mass %; and weight average molecular weight: 100,000)" provided by Kaneka Corporation was used.

[SIS]

D1161JP (the content of the styrene component: 15 mass %; weight average molecular weight: 150,000) provided by Kraton Polymers was used.

[Manufacture of SIBS Modified Copolymer]

Into a 2-liter separable flask, 75 g of a styrene-isobutylene block copolymer (the content of the styrene component: 30%; the number of moles of the styrene unit: 0.216 mol) was input, and the inside of the container was substituted by nitrogen. Using a syringe, 1200 mL of n-hexane dried with molecular sieves and 1800 ml of n-butyl chloride dried with molecular sieves were added.

Next, 30 g (0.291 mol) of methacrylic acid chloride was added using a syringe. Then, 39.4 g (0.295 mol) of aluminum trichloride was added while stirring the solution to start a reaction. After the reaction for 30 minutes, about 1000 ml of water was added to the reaction solution, which was stirred vigorously to terminate the reaction. The reaction solution was washed with a large amount of water several times, and further slowly dropped into a large amount of a methanol-acetone mixed solvent (1:1) to precipitate a reaction product. Then, the reaction product was vacuum dried at 60° C. for 24 hours to obtain an SIBS modified copolymer (weight average molecular weight: 150,000; the styrene content: 20 weight %; acid chloride: 1.0 weight %).

[Ultraviolet Absorber]

As a benzotriazol-based ultraviolet absorber provided by ADEKA Corporation, "ADK STAB LA-36" (2-(2'-hydroxy-3'-ter-butyl-5'-methylphenyl)-5-chlorobenzotriazol) was used. This ultraviolet absorber has a melting point of 138° C. to 141° C., a molecular weight of 315.8, and a maximum absorption wavelength of 353 nm.

[Antioxidant]

As a hindered phenolic antioxidant provided by BASF, "IRGANOX 1010" (pentaerythrityl tetrakis(3-(3,5-di-t-butyl-4-hydroxyphenyl) propionate) was used. This antioxidant has a melting point of 110° C. to 125° C., a specific gravity of 1.15, and a molecular weight of 117.7.

TABLE 1

| | | Example of Composition of First Layer | | | | | | |
|---|---|---|---|---|---|---|---|---|
| | | Comparative Composition 1 | Comparative Composition 2 | Comparative Composition 3 | Comparative Composition 4 | Comparative Composition 5 | Comparative Composition 6 | Example Composition 1 |
| SIBS | (mass %) | 100 | 100 | 100 | | 50 | 50 | 100 |
| SIBS modified | (mass %) | | | | 100 | 50 | 50 | |
| Tackifier | (mass %) | | | | | | | |
| Polyisobutylene | (mass %) | | | | | | | |
| Antioxidant | (mass %) | 0.4 | | 0.2 | 0.2 | 0.2 | 45.0 | 0.5 |
| Ultraviolet Absorber | (mass %) | | 0.4 | 0.2 | 0.2 | 0.2 | 45.0 | |

| | | Example of Composition of First Layer | | | | | | |
|---|---|---|---|---|---|---|---|---|
| | | Example Composition 2 | Example Composition 3 | Example Composition 4 | Example Composition 5 | Example Composition 6 | Example Composition 7 | Example Composition 8 |
| SIBS | (mass %) | 100 | 100 | 100 | 100 | | 50 | 50 |
| SIBS modified | (mass %) | | | | | 100 | 50 | 50 |
| Tackifier | (mass %) | | | | | | 10 | 10 |
| Polyisobutylene | (mass %) | | | | | | 10 | 10 |
| Antioxidant | (mass %) | 40.0 | | | 0.5 | 0.5 | 0.5 | 20.0 |
| Ultraviolet Absorber | (mass %) | | 0.5 | 40.0 | 0.5 | 0.5 | 0.5 | 20.0 |

TABLE 2

| | | Example of Composition of Second Layer | | | | | | | |
|---|---|---|---|---|---|---|---|---|---|
| | | Comparative Composition 7 | Comparative Composition 8 | Comparative Composition 9 | Comparative Composition 10 | Comparative Composition 11 | Comparative Composition 12 | Comparative Composition 13 | Example Composition 9 |
| SIS | (mass %) | 100 | 100 | 100 | | 50 | 50 | 35 | 100 |
| SIB | (mass %) | | | | 100 | | | | |
| SIBS | (mass %) | | | | | 50 | 50 | 35 | |
| SIBS modified copolymer | (mass %) | | | | | | | 30 | |
| Tackifier | (mass %) | | | | | | | | |
| Polyisobutylene | (mass %) | | | | | | | | |
| Antioxidant | (mass %) | 0.4 | | 0.2 | 0.2 | 0.2 | 45.0 | 45.0 | 0.5 |
| Ultraviolet Absorber | (mass %) | | 0.4 | 0.2 | 0.2 | 0.2 | 45.0 | 45.0 | |

| | | Example of Composition of Second Layer | | | | | | | |
|---|---|---|---|---|---|---|---|---|---|
| | | Example Composition 10 | Example Composition 11 | Example Composition 12 | Example Composition 13 | Example Composition 14 | Example Composition 15 | Example Composition 16 | Example Composition 17 |
| SIS | (mass %) | 100 | 100 | 100 | 100 | | 50 | 50 | 35 |
| SIB | (mass %) | | | | | 100 | | | |
| SIBS | (mass %) | | | | | | 50 | 50 | 35 |
| SIBS modified copolymer | (mass %) | | | | | | | | 30 |

TABLE 2-continued

| | | | | | | | | | |
|---|---|---|---|---|---|---|---|---|---|
| Tackifier | (mass %) | | | | | | | 10 | 10 |
| Polyisobutylene | (mass %) | | | | | | | 10 | 10 |
| Antioxidant | (mass %) | 40.0 | | | 0.5 | 0.5 | 0.5 | 20.0 | 20.0 |
| Ultraviolet Absorber | (mass %) | | 0.5 | 40.0 | 0.5 | 0.5 | 0.5 | 20.0 | 20.0 |

(Note 1)
Tackifier: C9 petroleum resin, ARKON P140 (provided by Arakawa Chemical Industries Co., Ltd.; softening point: 140° C.; weight average molecular weight Mw: 900).
(Note 2)
Polyisobutylene: "Tetrax 3T" provided by Nippon Oil Corporation (viscosity average molecular weight: 30,000; weight average molecular weight: 49,000).

<Method for Manufacturing Inner Liner>

Based on Example Compositions and Comparative Compositions shown in Tables 1 and 2, thermoplastic elastomer compositions such as the SIBS modified copolymer, SIBS, SIS, and SIB were pelletized using a biaxial extruder (screw diameter: φ50 mm; L/D: 30; cylinder temperature: 220° C.). Thereafter, the inner liner was fabricated using a T-die extruder (screw diameter: φ80 mm; L/D: 50; die gap width: 500 mm; cylinder temperature: 220° C.; film gauge for the first layer: 0.25 mm; film gauge for the second a layer and second b layer: 0.05 mm).

<Manufacturing of Pneumatic Tire>

A pneumatic tire of size of 195/65R15 having the basic structure shown in FIG. 1 was manufactured. That is, the above-described polymer layer stack was used for the inner liner to manufacture a raw tire, and press vulcanization was performed at 170° C. for 20 minutes. The vulcanized tire was cooled for 3 minutes at 110° C. without removing the tire from the vulcanization mold, and then was removed from the vulcanization mold. As a coolant therefor, water was used.

Table 1 shows details of Comparative Compositions 1 to 6 and Example Compositions 1 to 8 of the first layer, and Table 2 shows details of Comparative Compositions 7 to 13 and Example Compositions 9 to 17 of the second layer. These compositions were used for the first layer and the second layer to manufacture tires of Examples and Comparative examples. Their specifications and the result of performance evaluations are shown in Tables 3 and 4.

Comparative Examples 1 to 10

Comparative Examples 1 to 3 are example inner liners in which the SIBS was used for the first layer and the SIS was used for the second layer. Comparative Example 4 is an example inner liner in which the SIBS modified copolymer was used for the first layer and the SIS was used for the second layer. Comparative Examples 5 and 6 are example inner liners in which a mixture of the SIBS and the SIBS modified copolymer was used for the first layer and the SIS was used for the second layer. Comparative Example 7 is an example inner liner in which the SIBS was used for the first layer and a composite layer of the SIS (second a layer) and the SIB (second b layer) was used for the second layer.

Comparative Examples 8 and 9 are example inner liners in which the SIBS was used for the first layer and a mixture of the SIS and the SIBS was used for the second layer as a basic composition. Comparative Example 10 is an example inner liner in which the SIBS was used for the first layer and the SIS, the SIBS and the SIBS modified copolymer were used for the second a layer.

Examples 1 to 12

They are examples in which one or both of an ultraviolet absorber and an antioxidant were mixed into the first layer and the second layer by 0.5 mass % to 40 mass % relative to 100 mass % of the thermoplastic elastomer.

Examples 1 to 5 are example inner liners in which the SIBS was used for the first layer and the SIS was used for the second layer. Example 6 is an example inner liner in which the SIBS modified copolymer was used for the first layer and the SIS was used for the second layer. Examples 7 and 8 are example inner liners in which a mixture of the SIBS and the SIBS modified copolymer was used for the first layer and the SIS was used for the second layer.

Example 9 is an example inner liner in which the SIBS was used for the first layer, the SIS was used for the second a layer, and the SIB was used for the second b layer. Examples 10 and 11 are example inner liners in which the SIBS was used for the first layer and a mixture of the SIS and the SIBS was used for the second layer. Example 12 is an example inner liner in which the SIBS was used for the first layer and a mixture of the SIS, the SIBS and the SIBS modified copolymer was used for the second layer. It is recognized that each Example of the present invention has improved weather resistance index, flection crack growth index, and elastic modulus change index as compared with each Comparative Example.

Examples 1 and 2 are examples in which the amount of blending the antioxidant in the first layer are different. Examples 3 and 4 are examples in which the amount of blending the ultraviolet absorber in the first layer are different. Example 5 is an example in which the antioxidant and the ultraviolet absorber were blended by 0.5 mass % both in the first layer and the second layer.

TABLE 3

| | | Comparative Example 1 | Comparative Example 2 | Comparative Example 3 | Comparative Example 4 | Comparative Example 5 |
|---|---|---|---|---|---|---|
| First Layer | | Comparative Composition 1 | Comparative Composition 2 | Comparative Composition 3 | Comparative Composition 4 | Comparative Composition 5 |
| Second a Layer | | Comparative Composition 9 | Comparative Composition 9 | Comparative Composition 9 | Comparative Composition 9 | Comparative Composition 9 |

TABLE 3-continued

|  |  |  |  |  |  |  |
|---|---|---|---|---|---|---|
| Second b Layer |  |  |  |  |  |  |
| Tire Test | Weather Resistance Index | 100 | 102 | 101 | 101 | 101 |
|  | Flection Crack Growth Index | 100 | 100 | 100 | 101 | 101 |
|  | Elastic Modulus Change Index | 100 | 90 | 95 | 96 | 96 |
|  | Endurance Traveling Speed Index | 100 | 90 | 95 | 96 | 96 |
| Overall Judgment |  | B | B | B | B | B |

|  |  | Comparative Example 6 | Comparative Example 7 | Comparative Example 8 | Comparative Example 9 | Comparative Example 10 |
|---|---|---|---|---|---|---|
| First Layer |  | Comparative Composition 6 | Comparative Composition 3 | Comparative Composition 3 | Comparative Composition 3 | Comparative Composition 3 |
| Second a Layer |  | Comparative Composition 9 | Comparative Composition 9 | Comparative Composition 11 | Comparative Composition 12 | Comparative Composition 13 |
| Second b Layer |  |  | Comparative Composition 10 |  |  |  |
| Tire Test | Weather Resistance Index | 105 | 101 | 101 | 101 | 101 |
|  | Flection Crack Growth Index | 95 | 100 | 100 | 100 | 101 |
|  | Elastic Modulus Change Index | 90 | 96 | 95 | 95 | 95 |
|  | Endurance Traveling Speed Index | 90 | 96 | 95 | 95 | 96 |
| Overall Judgment |  | B | B | B | B | B |

TABLE 4

|  |  | Example 1 | Example 2 | Example 3 | Example 4 | Example 5 | Example 6 |
|---|---|---|---|---|---|---|---|
| First Layer |  | Example Composition 1 | Example Composition 2 | Example Composition 3 | Example Composition 4 | Example Composition 5 | Example Composition 6 |
| Second a Layer |  | Example Composition 13 | Example Composition 13 | Example Composition 13 | Example Composition 13 | Example Composition 13 | Example Composition 13 |
| Second b Layer |  |  |  |  |  |  |  |
| Tire Test | Weather Resistance Index | 101 | 102 | 110 | 131 | 111 | 111 |
|  | Flection Crack Growth Index | 105 | 150 | 101 | 101 | 106 | 110 |
|  | Elastic Modulus Change Index | 110 | 170 | 102 | 102 | 111 | 117 |
|  | Endurance Traveling Speed Index | 110 | 170 | 102 | 102 | 111 | 118 |
| Overall Judgment |  | A | A | A | A | A | A |

|  |  | Example 7 | Example 8 | Example 9 | Example 10 | Example 11 | Example 12 |
|---|---|---|---|---|---|---|---|
| First Layer |  | Example Composition 7 | Example Composition 8 | Example Composition 5 | Example Composition 5 | Example Composition 5 | Example Composition 5 |
| Second a Layer |  | Example Composition 13 | Example Composition 13 | Example Composition 13 | Example Composition 15 | Example Composition 16 | Example Composition 17 |
| Second b Layer |  |  |  | Example Composition 14 |  |  |  |
| Tire Test | Weather Resistance Index | 111 | 126 | 111 | 111 | 119 | 119 |
|  | Flection Crack Growth Index | 109 | 140 | 106 | 106 | 118 | 118 |

TABLE 4-continued

| | | | | | | |
|---|---|---|---|---|---|---|
| Elastic Modulus Change Index | 116 | 151 | 111 | 111 | 121 | 121 |
| Endurance Traveling Speed Index | 117 | 151 | 111 | 111 | 121 | 121 |
| Overall Judgment | A | A | A | A | A | A |

<Performance Test>

For each of the pneumatic tires manufactured as described above, the following performance test was conducted.

<Weather Resistant Test>

The inside of the inner liner was subjected to a weather resistant test using a Sunshine Super Long-Life Weather Meter provided by Suga Test Instruments Co., Ltd. under the following conditions. Irradiation was conducted for 60 hours under the conditions at a temperature in a bath of 63° C., at a humidity of 50%, at 60° C., and with rainfall for 12 minutes. The number of cracks in the inner liner after the test was calculated. With Comparative Example 1 being regarded as a reference, relative values of the number of cracks with other Comparative Examples and Examples were calculated, and a weather resistance index was calculated based on the following expression. As the value is larger, the weather resistance is more excellent.

Weather Resistance Index=(the Number of Cracks in Comparative Example 1)/(the Number of Cracks in Each Example)×100.

<Flection Crack Growth Test>

In endurance traveling test, evaluation was made depending on whether the inner liner was cracked or detached. Each trial tire was assembled to a JIS specification rim 15×6JJ. The tire internal pressure was set at 150 KPa, which was lower internal pressure than normal internal pressure. The load was set at 600 kg. The speed was set at 100 km/h. The travel distance was set at 20,000 km. Inside of the tire was observed to measure the number of cracks and detachments. With Comparative Example 1 being regarded as a reference, crack growth in each Comparative Example and each Example was expressed in an index. As the value of the index is larger, the flection crack growth is smaller.

Flection Crack Growth Index=(the Number of Cracks in Comparative Example 1)/(the Number of Cracks in Each Example)×100

<Elastic Modulus Change Index>

Under the conditions similar to the flection crack growth test, the inner liner of each pneumatic tire before traveling and after traveling 20,000 km was subjected to an evaluation on an increasing rate of dynamic modulus (F) using a viscoelasticity spectrometer VES (Iwamoto Factory) under the conditions of a temperature of 70° C., an initial strain of 10%, and a dynamic strain of 2%.

With Comparative Example 1 being regarded as a reference, an elastic modulus change index was calculated as a relative value of dynamic modulus (E') in each Comparative Example and each Example. As the value of the index is larger, the increasing rate of elastic modulus is smaller, which is excellent.

Elastic Modulus Change Rate=(Elastic Modulus After Traveling)/(Elastic Modulus Before Traveling)×100

Elastic Modulus Change Index=(Elastic Modulus Change Rate in Comparative Example 1)/(Elastic Modulus Change Rate in Each Example)×100.

<Endurance Traveling Test>

In an endurance traveling test, a traveled distance until a tire was damaged was measured with oxygen being injected. Each trial tire is left for 336 hours in an atmosphere of 90% of oxygen and a relative humidity of 70%. Thereafter, the tire was assembled to a rim, and 100% of oxygen was injected. The tire was left for 336 hours at an internal pressure of 350 kPa in an atmosphere of 90% of oxygen and a relative humidity of 70%. Thereafter, the tire was assembled to a JIS specification rim 15×6JJ, and 100% of oxygen was injected. The tire internal pressure was set at 280 kPa. The tire was thus prepared.

Traveling was started under the traveling conditions of a load of 500 kg and a speed of 170 km/h. A break-in was conducted for 10 minutes, followed by cooling. Traveling was started again at 170 km/h. The speed was increased by 10 km/h every 20 minutes during traveling, and the traveling speed was measured until the tire was broken down.

The traveled distance at the time of breakdown in each Comparative Example and each Example was calculated, and its relative value was calculated as an index with Comparative Example 1 being regarded as a reference. As the value of the index is larger, the durable traveling speed is higher, which is excellent.

Endurance Traveling Speed Index=(Traveling Speed at Breakdown in each Example)/(Traveling Speed at Breakdown in Comparative Example 1)×100.

<Overall Judgment>

A tire that satisfied all of the following conditions was judged as A.

(a) weather resistance index of more than or equal to 100;

(b) flection crack growth index of more than or equal to 100;

(c) elastic modulus change index of more than or equal to 100; and (d) endurance traveling speed index of more than 100.

A tire that satisfied any one of the following conditions was judged as B.

When plural judgments applied, a lower evaluation was adopted.

(a) weather resistance index of less than or equal to 100;

(b) flection crack growth index of less than or equal to 100;

(c) elastic modulus change index of less than or equal to 100; and (d) endurance traveling speed index of more than 100.

REFERENCE SIGNS LIST

1 pneumatic tire; 2 tread portion; 3 sidewall portion; 4 bead portion; 5 bead core; 6 carcass ply; 7 belt layer; 8 bead apex; 9 inner liner; PL polymer layer stack; PL1 SIBS layer; PL2 SIS layer; PL3 SIB layer.

The invention claimed is:

1. A pneumatic tire comprising an inner liner disposed inwardly in the tire relative to a carcass ply bridged between a pair of bead portions, said inner liner being formed of a first layer disposed inwardly in the tire and a second layer disposed to be in contact with a rubber layer of said carcass ply, said first layer being a thermoplastic elastomer composition containing a thermoplastic elastomer component containing a styrene-isobutylene-styrene block copolymer and an SIBS modified copolymer having a styrene block moiety modified with acid chloride or acid anhydride having an unsaturated bond, the thermoplastic elastomer composition also containing at least one of an ultraviolet absorber and an antioxidant, and said second layer being a thermoplastic elastomer composition containing at least one of a styrene-isoprene-styrene block copolymer and a styrene-isobutylene block copolymer, wherein the styrene-isobutylene-styrene block copolymer is in an amount of more than 0 mass % of the thermoplastic elastomer component, and the SIBS modified copolymer is in an amount of 10 mass % or more of the thermoplastic elastomer component, and wherein the SIBS modified copolymer contains acid chloride or acid anhydride having an unsaturated bond at a content of more than or equal to 1 wt % and less than or equal to 30 wt %.

2. The pneumatic tire according to claim 1, wherein said first layer contains at least one of the ultraviolet absorber and the antioxidant blended therein by 0.5 mass % to 40 mass % of a thermoplastic elastomer component.

3. The pneumatic tire according to claim 1, wherein the thermoplastic elastomer composition of said second layer further contains the SIBS modified copolymer blended therein by 5 mass % to 80 mass % of a thermoplastic elastomer component.

4. The pneumatic tire according to claim 1, wherein the thermoplastic elastomer composition of one of said first layer and said second layer contains a tackifier blended therein.

* * * * *